United States Patent [19]

Numata

[11] 4,331,401
[45] May 25, 1982

[54] EXPOSURE CONTROL SYSTEM FOR A PHOTOGRAPHIC CAMERA

[75] Inventor: Saburo Numata, Urawa, Japan

[73] Assignee: Fuji Photo Optical Co., Ltd., Saitama, Japan

[21] Appl. No.: 239,030

[22] Filed: Feb. 27, 1981

Related U.S. Application Data

[63] Continuation-in-part of Ser. No. 33,301, Apr. 25, 1979, abandoned.

[30] Foreign Application Priority Data

Apr. 27, 1978 [JP] Japan ................... 53-50427

[51] Int. Cl.³ ............................................. G03B 7/087
[52] U.S. Cl. ......................................... 354/37; 354/60 R
[58] Field of Search ................................. 354/36–38, 354/28, 41, 60 R, 51, 50, 49, 43, 44, 42

[56] References Cited

U.S. PATENT DOCUMENTS

| | | | |
|---|---|---|---|
| 4,062,023 | 12/1977 | Kobori et al. | 354/37 X |
| 4,090,207 | 5/1978 | Mashimo et al. | 354/38 |
| 4,107,707 | 8/1978 | Numata et al. | 354/60 R |
| 4,146,317 | 3/1979 | Date et al. | 354/38 |
| 4,150,889 | 4/1979 | Ueda et al. | 354/37 |
| 4,174,160 | 11/1979 | Nanba et al. | 354/37 X |

*Primary Examiner*—L. T. Hix
*Assistant Examiner*—William B. Perkey

[57] ABSTRACT

In a photographic camera with an automatic exposure control system, a voltage obtained by a light measuring circuit with reference to a reference voltage based on a film speed is divided into $1/n$ and $(n-1)/n$ of the voltage. The scene brightness is measured while the diaphragm provided before a photosensor of the light measuring circuit is stopped down until the output voltage of the light measuring circuit becomes equal to $1/n$ of the voltage. After the output voltage has become $1/n$ of the voltage, the diaphragm is held in its position and then the shutter speed is controlled according to the $(n-1)/n$ voltage.

3 Claims, 2 Drawing Figures

EXPOSURE CONTROL SYSTEM FOR A PHOTOGRAPHIC CAMERA

This is a continuation-in-part of U.S. Patent application Ser No. 33,301, filed Apr. 25, 1979, now abandoned.

BACKGROUND OF THE INVENTION

1. Field of the Invention

This invention relates to an exposure control system for a photographic camera, and more particularly to a program control type exposure control system for a dual priority automatic exposure control camera.

2. Description of the Prior Art

In the conventional automatic exposure control cameras, there are aperture priority and shutter speed priority automatic exposure control cameras. Further, there are also known program control type exposure control cameras in which both the aperture and the shutter speed are controlled.

The conventional single lens reflex cameras provided with an automatic exposure control system are based on one of the above three known systems. These exposure control systems are, however, disadvantageous in that it is impossible to freely select a desired one of the exposure factors, i.e. aperture or shutter speed. Therefore, it has recently been developed to provide a dual priority automatic exposure control camera in which a desired one of the aperture and the shutter speed can be selected in advance and the other is automatically controlled. In such a dual priority automatic exposure control camera, a memory means like ROM of a micro-computer is employed to provide memorized combinations of shutter speed and aperture size to conduct a program control of exposure. Therefore, the structure of the exposure control mechanism is complex and the manufacture thereof is difficult as well.

SUMMARY OF THE INVENTION

The primary object of the present invention is, therefore, to provide a simple exposure control system for a photographic camera of dual priority type which is capable of making a program control of exposure.

Another object of the present invention is to provide a simple exposure control system for a photographic camera in which the control of aperture is conducted with high accuracy.

The exposure control system in accordance with the present invention is characterized in that the voltage corresponding to the exposure value (an output of a light measuring circuit and an output of a film speed setting circuit) is divided into $1/n$ and $(n-1)/n$ of the voltage and the aperture is controlled by use of the $1/n$ voltage and the shutter speed is controlled by use of the $(n-1)/n$ voltage. In more detail, the scene brightness is measured while the aperture is stopped down until the output voltage of the scene brightness measuring circuit becomes equal to $1/n$ of the voltage corresponding to the exposure value and after the output voltage has become the $1/n$, the aperture is held in the fixed value and the shutter speed is controlled thereafter according to the $(n-1)/n$ voltage. Thus, both the aperture size and the shutter speed are properly controlled according to the output of the light measuring circuit.

In order to obtain the $1/n$ voltage, a divider is used and the $1/n$ voltage and the $(n-1)/n$ voltage are obtained simultaneously. As the most simplified divider can be used a series circuit of two resistors of the same resistance connected between a terminal for output of the scene brightness and a terminal for output of the film speed in which the middle connecting point of the series circuit is used to output the divided voltage. In this case, the divided output is ½ of the voltage corresponding to the correct exposure value. Therefore, in this case, the shutter speed and the aperture size are controlled by use of the ½ voltage. When the exposure value changes one step, the shutter speed and the aperture size controlled are changed ½ step. Since the program control is usually desired to be made in such a way that the output of the light measuring circuit is divided into half and half and each used for controlling the aperture size and the shutter speed, the above division of the output is practically most desirable.

DESCRIPTION OF THE PREFERRED EMBODIMENT

Figure 1:
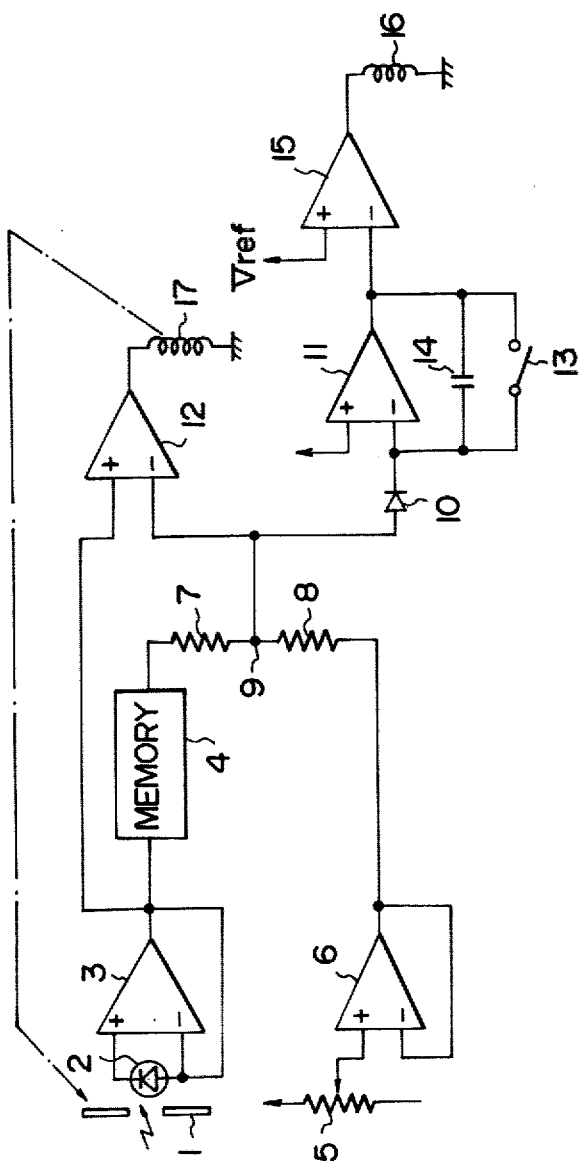
FIG. 1 is a block diagram showing the electric circuitry of the exposure control system in accordance with an embodiment of the present invention in which $1/n$ is made ½.

Referring to FIG. 1, a diaphragm 1 is provided in front of a photosensor 2 to control the amount of light impinging thereupon. The photosenser 2 such as a silicon blue cell generates a photocurrent corresponding to the amount of light received thereby. The photocurrent is amplified by a light measuring circuit 3 including an operational amplifier and converted to a voltage thereby to be memorized by a memory 4.

On the other hand, the film speed is set by a potentiometer 5 and the voltage corresponding to the film speed is input into a buffer 6.

A divider consisting of a pair of resistors 7 and 8 of the same resistance connected in series is connected between the output of the memory 4 and the output of the buffer 6. By the divider, the voltage corresponding to the exposure value is divided into ½ and ½.

With the conjunction 9 between the pair of resistors 7 and 8 is connected an integrating circuit 11 for controlling the shutter speed by way of a diode 10. The integrating circuit 11 functions to charge a capacitor 14 connected therewith at a constant rate corresponding to the input voltage of the negative input terminal thereof when the trigger switch 13 connected in parallel with the capacitor 14 is turned off. The voltage of the capacitor 14 is input into a comparator 15 and compared therein with a reference voltage $V_{ref}$. When both the voltages have become equal to each other, a trailing shutter blind holding magnet 16 is turned off to release the trailing shutter blind and close the shutter. Thus, the shutter speed is controlled in accordance with the half level (½) of the output of the sum of the output of the memory 4 and the buffer 6.

Further, with the conjunction 9 between the pair of resistors 7 and 8 is connected a comparator 12 for controlling the aperture. The comparator 12 for controlling the aperture compares the voltage (½ of the output of the memory 4) at the conjunction 9 with the output voltage of the light measuring circuit 3 and turns off another magnet 17 which drives the diaphragm 1 when both the output becomes equal.

In operation of the above described embodiment of the invention, the diaphragm 1 is first fully opened and the amount of light received by the photosensor 2 is measured. Based on the brightness measured, a photocurrent flows through the photosensor 2. The photocurrent is amplified by the light measuring circuit 3 and converted to a voltage and then memorized by the memory 4 upon half depression of a shutter release button not shown. Thus, a voltage corresponding to the scene brightness is memorized by the memory 4.

On the other hand, the film speed set at the potentiometer 5 is input into the buffer 6. Since the buffer 6 and the memory 4 are connected by way of a divider, the exposure value is calculated based on the scene brightness memorized in the memory 4 and on the film speed in the buffer 6 and is divided into $\frac{1}{2}$ and $\frac{1}{2}$ thereof.

The voltage of $\frac{1}{2}$ of the voltage corresponding to the exposure value is input into the comparator 12. Upon half depression of the shutter release button, the comparator 12 operates and starts to stop down of the diaphragm 1 from the fully open position. By the stop down of the diaphragm 1, the amount of light passing through the stopped down diaphragm 1 is measured by the light measuring circuit 3. When the output voltage of the light measuring circuit 3 has become equal to the voltage at the conjunction 9 that is $\frac{1}{2}$ of the voltage corresponding to the exposure value, the comparator 12 is inverted and turns off the magnet 17. When the magnet 17 is turned off, the stop down of the diaphragm 1 is stopped and the diaphragm is fixed at the position.

Upon further depression of the shutter release button, the shutter is opened by releasing the leading shutter blind not shown and a trigger switch is turned off. Then, the capacitor 14 starts to be charged by the current corresponding to the $\frac{1}{2}$ voltage. When the voltage of the capacitor 14 has reached a predetermined level, the comparator 15 is inverted and the trailing shutter blind holding magnet 16 is turned off to close the shutter.

Hence, the aperture size and the shutter speed are controlled each based on the half level ($\frac{1}{2}$) of the output of the light measuring circuit 3 first memorized in the memory 4. Since the output is half divided, the most appropriate program control can be effected.

In the above described embodiment, the output voltage of the light measuring circuit and the film speed setting circuit is divided into $\frac{1}{2}$ and $\frac{1}{2}$. In case where it is divided into $\frac{1}{3}$ and $\frac{2}{3}$, there should be used a divider which divides it into $\frac{1}{3}$ and $\frac{2}{3}$. An example of such a divider is shown in FIG. 2.

Figure 2:
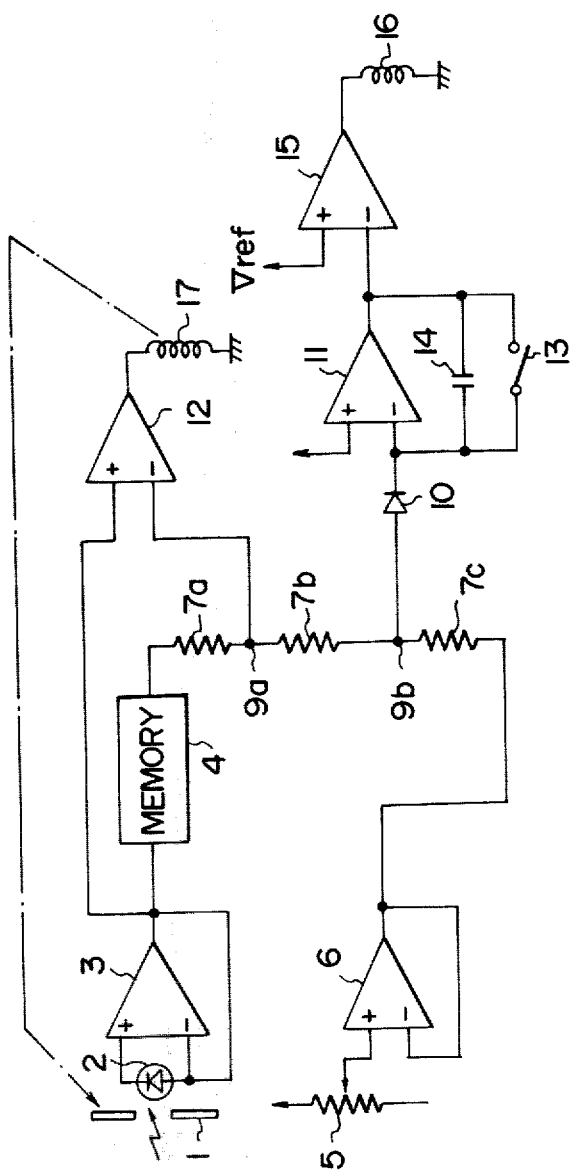
FIG. 2 is a block diagram showing another embodiment of the present invention in which $1/m$ is ⅓.

Referring to FIG. 2, wherein all the elements equivalent to those in FIG. 1 are designated by the same reference numeral, there is used a voltage divider consisting of a series circuit of three resistances 7a, 7b and 7c of the same resistance. With the two conjunctions 9a and 9b therebetween, the aperture control means 12 and the shutter speed control means 11 are connected, respectively. At the conjunction 9a, $\frac{2}{3}$ *of the output voltage of the memory 4 and the buffer 6 is obtained, and at the conjunction 9b,* $\frac{1}{3}$ thereof is obtained. By changing the resistance of the middle resistor 7b, the level of the voltage at the two junctions 9a and 9b can be changed. For instance, by making the resistance of the first resistor 7a equal to that of the third resistor 7c and making the resistance of the second resistor 7b (n−2) times as large as that of the first and third resistors 7a and 7c, it is possible to give 1/n level of the output voltage level at the first junction 9b and (n−1)/n level at the second junction 9a.

What is claimed is:

1. An exposure control system for a camera provided with an automatic exposure control means including a light measuring circuit having a photosensor and giving an output corresponding to scene brightness measured through an aperture located in front of the photosensor, a memory means for memorizing the output of said output, a film speed setting means, a voltage divider connected with the output of the memory means for dividing the output voltage of the memory means, an aperture control means connected with said memory means via said voltage divider and with said light measuring means for controlling the size of said aperture based on the difference between the output of the light measuring means and the output of the voltage divider, and a shutter speed control means connected with said voltage divider and said film speed setting means for controlling exposure time based on the difference between the output of the film speed setting means and the output of the voltage divider.

2. An exposure control system for a camera as defined in claim 1 wherein said voltage divider divides the output voltage of the memory means and the film speed setting means into 1/n and (n−1)/n of the output voltage.

3. An exposure control system for a camera as defined in claim 1 wherein said divider comprises a pair of resistors of the same resistance connected in series and connected between the output of said film speed setting means and said memory means.

* * * * *